United States Patent
Harrington et al.

(10) Patent No.: US 8,949,232 B2
(45) Date of Patent: Feb. 3, 2015

(54) SOCIAL NETWORK RECOMMENDED CONTENT AND RECOMMENDING MEMBERS FOR PERSONALIZED SEARCH RESULTS

(75) Inventors: Timothy Harrington, Mountain View, CA (US); Rajesh Shenoy, San Jose, CA (US); Marc Najork, Palo Alto, CA (US); Rina Panigrahy, San Ramon, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/252,215

(22) Filed: Oct. 4, 2011

(65) Prior Publication Data

US 2013/0086057 A1 Apr. 4, 2013

(51) Int. Cl.
*G06F 17/30* (2006.01)
*H04L 12/58* (2006.01)

(52) U.S. Cl.
CPC ...................................... *H04L 51/32* (2013.01)
USPC .......................................... 707/732; 707/802

(58) Field of Classification Search
CPC ................................................ G06F 17/30867
USPC ................................................ 707/802, 732
See application file for complete search history.

(56) References Cited

U.S. PATENT DOCUMENTS

| | | | |
|---|---|---|---|
| 6,584,401 B2 | 6/2003 | Kirshenbaum et al. | |
| 7,853,622 B1 * | 12/2010 | Baluja et al. | 707/803 |
| 7,860,889 B1 * | 12/2010 | Martino et al. | 707/784 |
| 8,180,804 B1 * | 5/2012 | Narayanan et al. | 707/798 |
| 2003/0037015 A1 | 2/2003 | Aggarwal | |
| 2006/0101377 A1 | 5/2006 | Toyama et al. | |
| 2007/0214121 A1 | 9/2007 | Ebanks | |
| 2008/0301112 A1 | 12/2008 | Wu | |
| 2009/0193352 A1 * | 7/2009 | Bunn | 715/780 |

(Continued)

FOREIGN PATENT DOCUMENTS

| | | |
|---|---|---|
| JP | 2009-238007 A | 10/2009 |
| KR | 10-2010-0058405 A | 6/2010 |
| KR | 10-2011-0019131 A | 2/2011 |

OTHER PUBLICATIONS

International Search Report, mailed Apr. 29, 2013, received in PCT Application No. PCT/US2012/058586.

(Continued)

*Primary Examiner* — Cam-Y Truong
(74) *Attorney, Agent, or Firm* — Dave Ream; Jim Ross; Micky Minhas

(57) ABSTRACT

Architecture that provides a data structure to facilitate personalized ranking over recommended content (e.g., documents). The data structure approximates the social distance of the searching user to the content at query time. A graph is created of content recommended by members of the social network, where the nodes of the graph include content nodes (for the content) and recommending member nodes (for members of the social network who recommended the content). If a member recommends content, an edge is created between the member node and the content node. If a member is a "friend" (tagged as related in some way) of another member, an edge is created between the two member nodes. Each node is converted to a lower dimensional feature set. Feature sets of the content are indexed and the feature set of the searching user is utilized to match and rank the search results at query time.

13 Claims, 8 Drawing Sheets

(56) References Cited

U.S. PATENT DOCUMENTS

| | | | |
|---|---|---|---|
| 2010/0121838 A1* | 5/2010 | Tankovich et al. | 707/715 |
| 2010/0312724 A1 | 12/2010 | Pinckney et al. | |
| 2011/0035329 A1 | 2/2011 | Delli Santi et al. | |
| 2011/0082898 A1* | 4/2011 | Foster et al. | 709/202 |
| 2011/0087661 A1 | 4/2011 | Quick et al. | |
| 2011/0093346 A1 | 4/2011 | Lunt et al. | |
| 2011/0093498 A1* | 4/2011 | Lunt et al. | 707/769 |
| 2011/0173189 A1* | 7/2011 | Singh et al. | 707/722 |
| 2011/0184981 A1* | 7/2011 | Lu et al. | 707/774 |
| 2011/0191327 A1* | 8/2011 | Lee | 707/723 |
| 2011/0202846 A1* | 8/2011 | Najork et al. | 715/736 |
| 2011/0276566 A1* | 11/2011 | Goel et al. | 707/724 |
| 2012/0010997 A1* | 1/2012 | Nair et al. | 705/14.54 |
| 2012/0078953 A1* | 3/2012 | Araya | 707/769 |
| 2012/0191716 A1* | 7/2012 | Omoigui | 707/740 |
| 2012/0204222 A1* | 8/2012 | Bodi et al. | 726/1 |

OTHER PUBLICATIONS

Office Action received in Chinese application No. 200980143794.4, mailed May 28, 2013.

Carmel, et al., "Personalized Social Search Based on the User's Social Network", Retrieved at <<http://users.cs.fiu.edu/~vagelis/classes/CAP6776/publications/personalizedSocialSearch%2O CIKM2009.pdf>>, Proceeding of the 18th ACM conference on Information and knowledge management, Nov. 2-6, 2009.

Taylor, Bret., "Bringing Your Friends to Bing-Search Now More Social", Retrieved at <<http://www.scribd.com/document_downloads/direct/39278599?extension=pdf&ft=1309941206&It=1309944816&uahk=TKLt99qIE3+uQ6BfxWQj6eMXrJA>>, Oct. 13, 2010.

"Getting Acquainted with Social Search and My Social Circle", Retrieved at <<http://gracemediainc.com/getting-acquainted-with-social-search-and-my-social-circle/>>, Sep. 2, 2010.

McGee, Matt., "Google's Search Results Get More Social; Twitter As The New Facebook "Like"", Retrieved at <<http://searchengineland.com/google-expands-social-circle-in-search-results-including-page-rankings-65202>>, Feb. 17, 2011.

Moehring, Keith., "Social Media's Impact on Search", Retrieved at <<http://www.pr2020.com/page/social-medias-impact-on-search>>, Feb. 17, 2011.

Sarma, et al., "A Sketch-Based Distance Oracle for Web-Scale Graphs", WSDM'10, Feb. 4-6, 2010.

Office Action received in Chinese Application No. 200980143794.4, dated Nov. 22, 2013, including English language translation.

\* cited by examiner

US 8,949,232 B2

SOCIAL NETWORK RECOMMENDED CONTENT AND RECOMMENDING MEMBERS FOR PERSONALIZED SEARCH RESULTS

BACKGROUND

Social networks provide users several mechanisms to recommend documents (e.g., webpages that have "Recommend", "Share", "Like", "Buzz" action buttons for this purpose) to other users of the social network. As the number of these recommended pages increases, users of the social network rely on a search engine to provide them with a personalized ranking of these documents for queries, which search engines are deficient in such capabilities.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides an efficient data structure that facilitates personalized ranking over recommended content (e.g., documents), and yet does not increase in size as the number of recommendations of the content increases. The data structure approximates the social distance of the searching user to the content at query time.

The architecture creates a graph of content recommended by members of the social network, where the nodes of the graph are content nodes (for the content) and entity nodes (e.g., member attributes, member interests, member identities, etc.) of recommending member (for members of the social network who recommended the content). If a member recommends content, an edge is created between the entity node and the content node. If a member is a "friend" (tagged as related in some way) of another member, an edge is created between the two member nodes (e.g., where the entity nodes are member nodes).

The architecture converts each node of the graph to a lower dimensional feature set (e.g., a vector) of auxiliary information. In an offline computation, a small number of sets of the nodes (referred to as sets of seed nodes) is sampled. The feature set (also referred to as a sketch in some literature) for a node comprises its closest seeds and the distances to those seeds. Feature sets are generated for all nodes of the graph such that the social distance between the nodes is approximated by distances between the feature sets. Feature sets of the content are indexed and the feature set of the searching user is utilized to match and rank the search results efficiently at query time thereby providing a personalized ranking of the search results.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
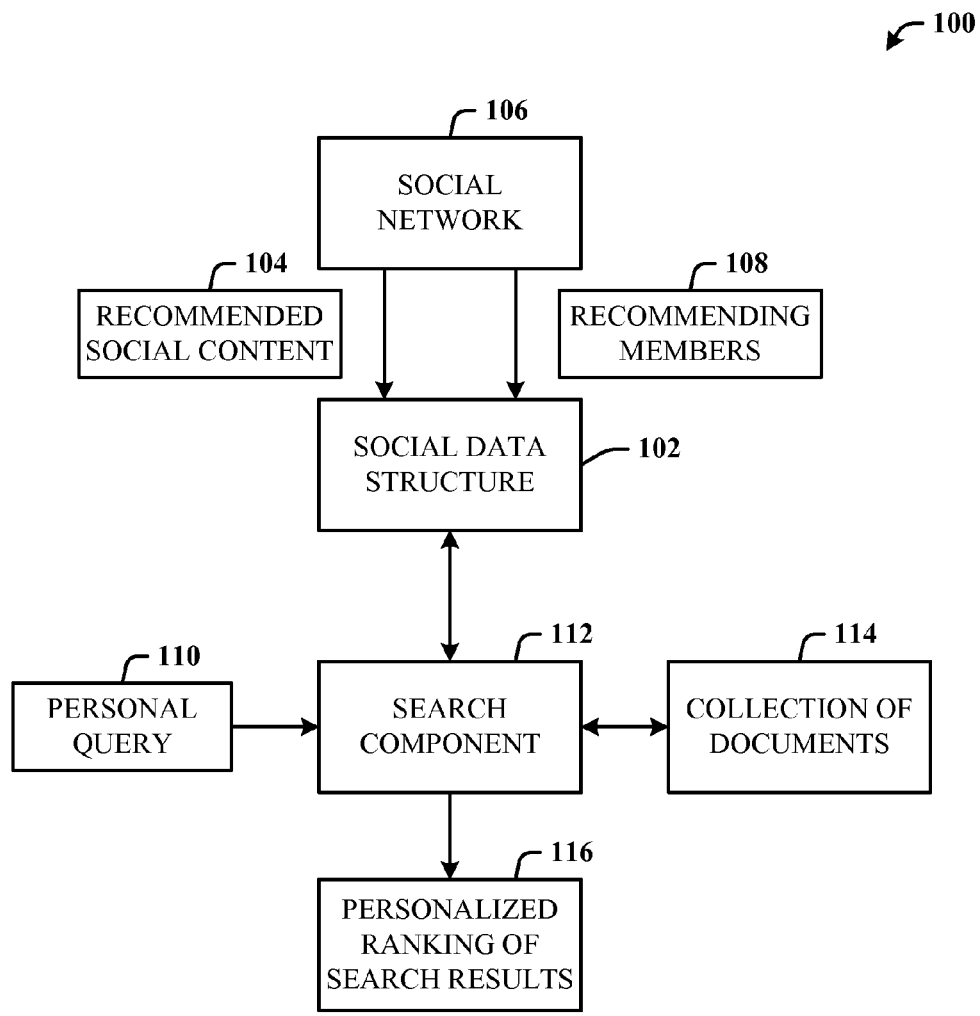
FIG. 1 illustrates a system that employs social network content and members in accordance with the disclosed architecture.

The disclosed architecture creates an efficient data structure (e.g., a graph) of content recommended by members of a social network, where the nodes of the graph are the content and members. Thus, a social network can be utilized to produce personalized rankings of search results (e.g., web documents).

The architecture provides the approach of creating a graph that includes both the users of a social network and the content recommended by the users (each unique piece of content is identified by a unique ID). User nodes are linked together according to links present on the social network. Content nodes are linked to the users that recommend the content.

The graph is used to generate feature sets that allow the graph relationships to be compactly represented and indexed in such a way that a keyword-based search can be used to retrieve only the content nodes linked to users that are in the social circle of the person performing the search. This type of search can be referred to as a "social circle query". The architecture combines a traditional query (e.g., a search for "digital camera") with a social circle query in order locate traditional query results that intersect the social circle query results (e.g., web documents that contain "digital camera" that were liked by the user's set of social network "friends").

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 that employs social network content and members in accordance with the disclosed architecture. The system 100 includes a social data structure 102 that defines relationships between social content recommended by members (recommended social content 104) of a social network 106 and the recommending members 108. The social data structure 102 is retrieved at index time for utilization in processing a personal query 110 of a searching user. The social data structure 102 approximates the social distance between the entities associated with the searching user and the recommended social content 104. The social distance can be based on the entities such as attributes of the user (e.g., demographic, location, home town, education, employer, school, etc.) and/or interests of the user (e.g., websites, activities, topics, media perceived, etc.), for example. Thus, with respect to attributes of a user, content recommended by another member in the same location can be ranked higher for the user. Similarly, with respect to interests of the user, where the interest is a music group, content recommended by other fans of the music group can be ranked higher for the user.

The system 100 can further comprise a search component 112 that processes the personal query 110 against the social data structure 102 and a collection of documents 114 (e.g., World Wide Web, corporate document repository, etc.) to return a personalized ranking of the search results 116.

The social data structure 102 can be a graph of nodes (retrieved), where the nodes include entity nodes (e.g., members, attributes, interests, etc.) and content nodes. The content nodes can be documents of the recommending social network members and the entity nodes can be of the recommending members. The content nodes can each be identified according to a content identifier and the entity nodes can each be identified according to an entity identifier.

The search component 112 processes the personal query 110 as a social circle query against the social network 106. The search results 116 can be an aggregation or subset (e.g., intersection) of results from the social network 106 and the collection of documents 114. The social circle query includes the personal query and feature set keywords appended to the personal query that are processed against an index of keywords.

Figure 2:
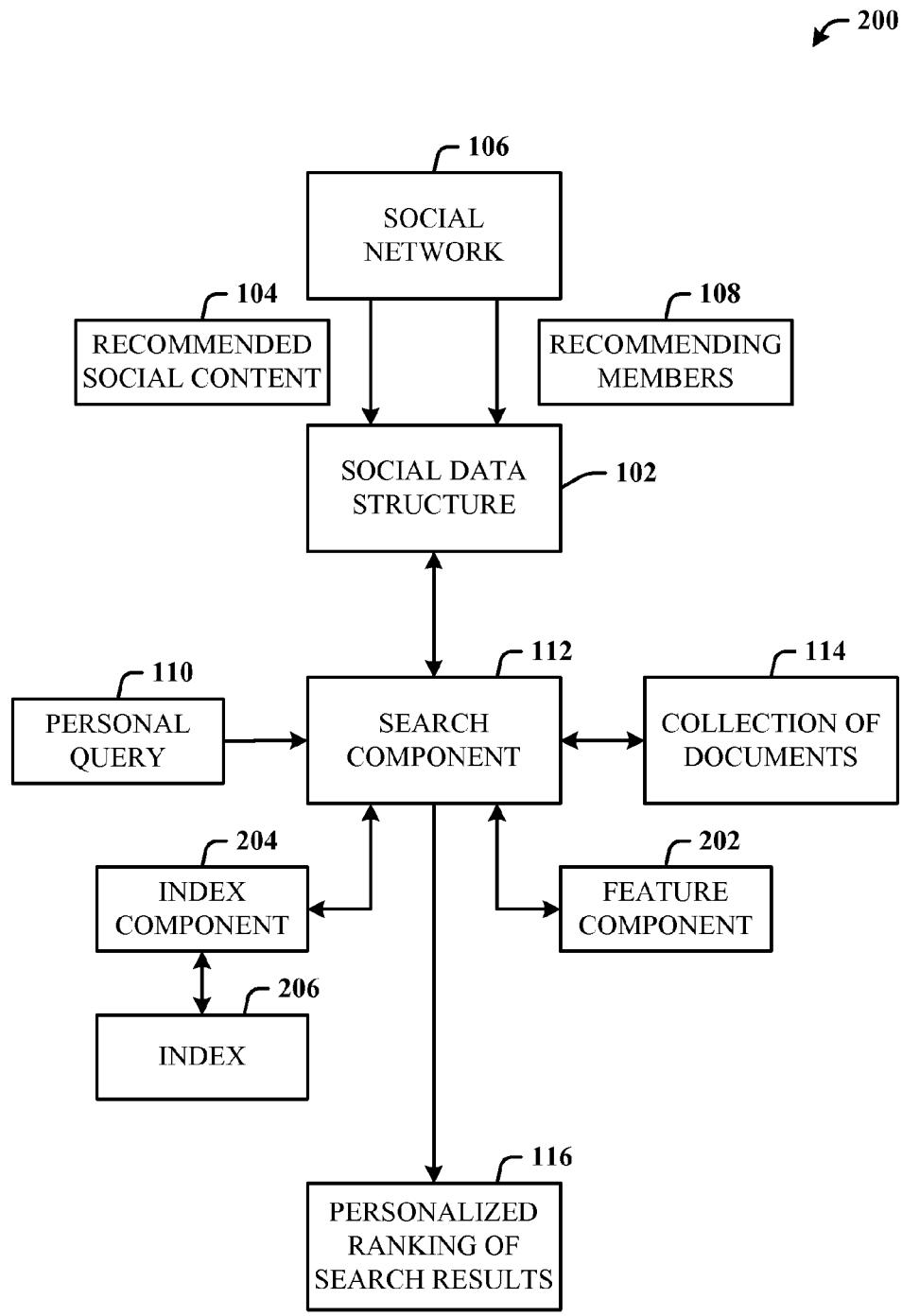
FIG. 2 illustrates an alternative system that further comprises a feature component and an index component.

FIG. 2 illustrates an alternative system 200 that further comprises a feature component 202 and an index component 204. The feature component 202 creates a feature set for each node, where distance between the nodes (e.g., two member nodes) is approximated by distance between corresponding feature sets of the nodes. The index component 204 indexes feature sets at query time. The feature set of the searching user is used to match content of the social data structure 102 and rank the search results at query time.

Figure 3:
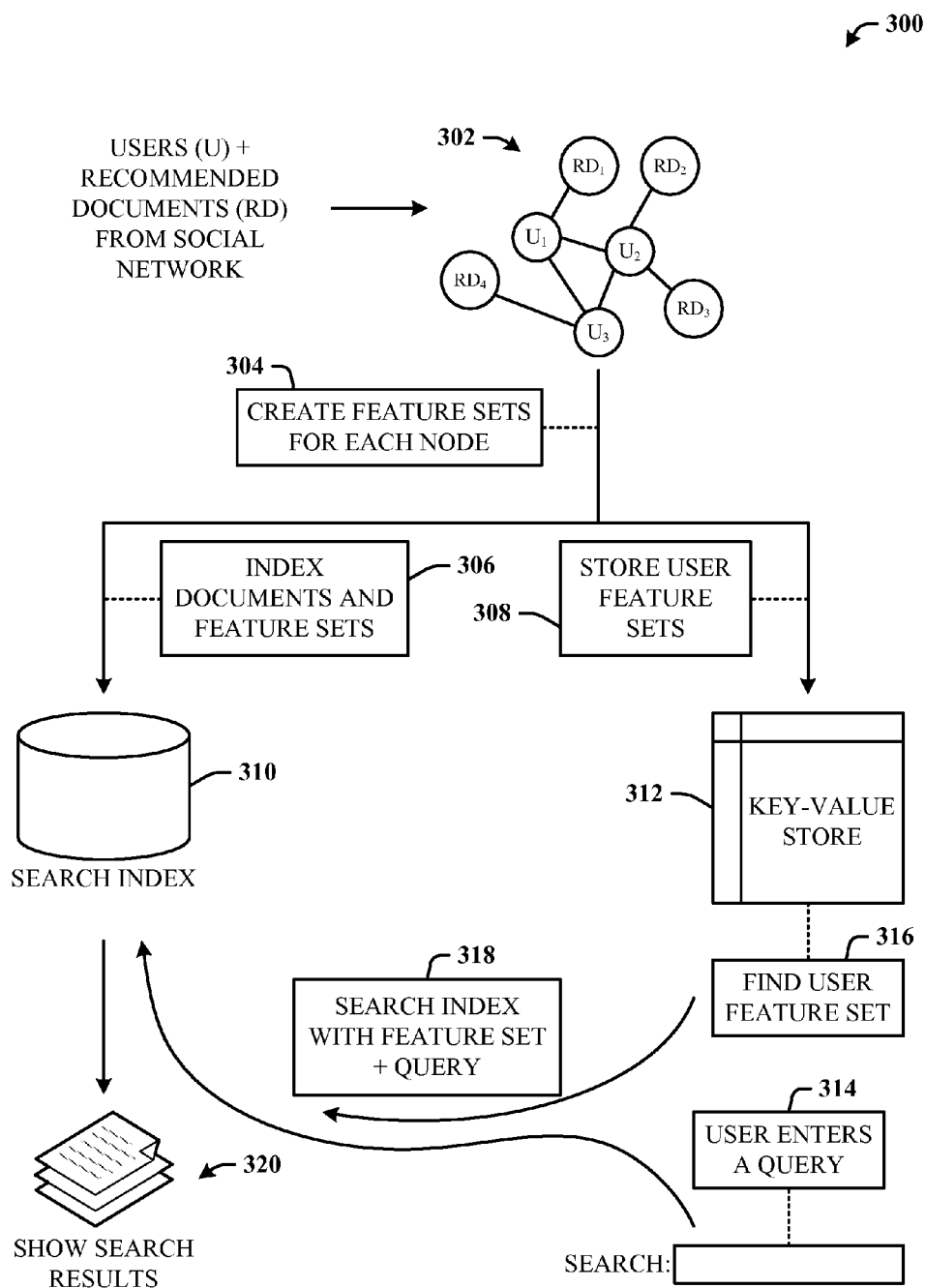
FIG. 3 illustrates a flow diagram that employs social network content and member relationships in accordance with the disclosed architecture.

FIG. 3 illustrates a flow diagram 300 that employs social network content and member relationships in accordance with the disclosed architecture. In terms of the content being documents, initially, a graph 302 is created of social network users (U) and recommended documents (RDs). The graph 302 is of documents recommended by members of the social network, where the nodes of the graph are the recommended documents and social network users. If a user recommends a document, an edge (link or relationship) is created between the user node and the document node (e.g., between user $U_1$ and recommended document $RD_1$). If a user is designated a "friend" of another user, an edge (link or relationship) is created between the two corresponding user nodes (e.g., between user $U_1$ and user $U_2$).

At 304, the system creates feature sets for each graph node. At 306, the documents and feature sets are indexed in a search index 310. At 308, user feature sets are stored in a key-value store 312.

At 314, a user enters a query. At 316, the feature set of the user entering the query, is found from the key-value store 312. At 318, the search index is searched using the feature set and the query. At 320, the search results are presented.

More specifically, the index 310 is prepared, and then searched. With respect to preparing the index 310, the combined graph 302 of user nodes and content nodes is prepared with each content node identified by a unique content ID (CID) and each user node identified by a unique user ID (UID). Next, one feature set is generated for every node in the graph 302. Each CID is then indexed in the index 310, storing the content and the feature set broken down into searchable keywords. Additionally, for each UID, store the associated feature set in the key-value store 312 so that a feature set can easily be searched for a given UID.

With respect to searching the index 310, first identify the searcher as a social network user and lookup that user's UID. The feature set for the searcher UID is found. The feature set is then converted into searchable keywords using the same approach above applied when preparing the index 310. When the searcher issues a query (at 314), the sketch keywords are appended to the query before sending the query to the index 310.

In this manner, the results returned by the query match the original query and comprise content produced by users in the searcher's social circle. By modifying the way feature sets are created, it is possible to expand/contract the size of the social circle (e.g., by limiting it to friends of the searcher vs. expanding it to include friends and friends' friends).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
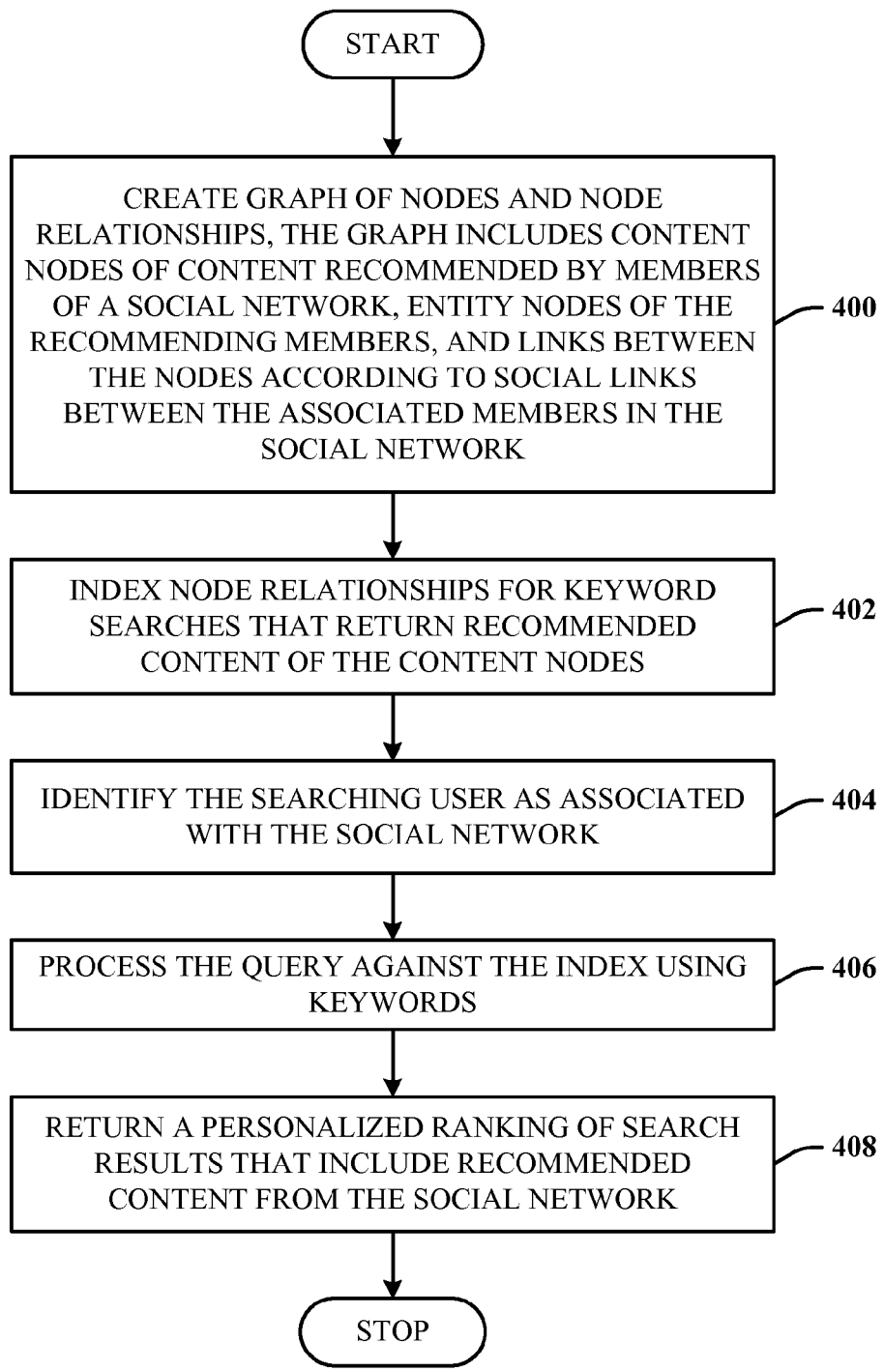
FIG. 4 illustrates a method in accordance with the disclosed architecture.

FIG. 4 illustrates a method in accordance with the disclosed architecture. At 400, a graph of nodes and node relationships is created. The graph includes content nodes of content recommended by members of a social network, entity nodes of the recommending members, and links between the nodes according to social links between the associated members in the social network. At 402, the node relationships are indexed for keyword searches that return recommended content of the content nodes. At 404, a searching user is identified as associated with the social network. At 406, a query is processed against the index using keywords. At 408, a personalized ranking of search results is returned that includes recommended content from the social network.

Figure 5:
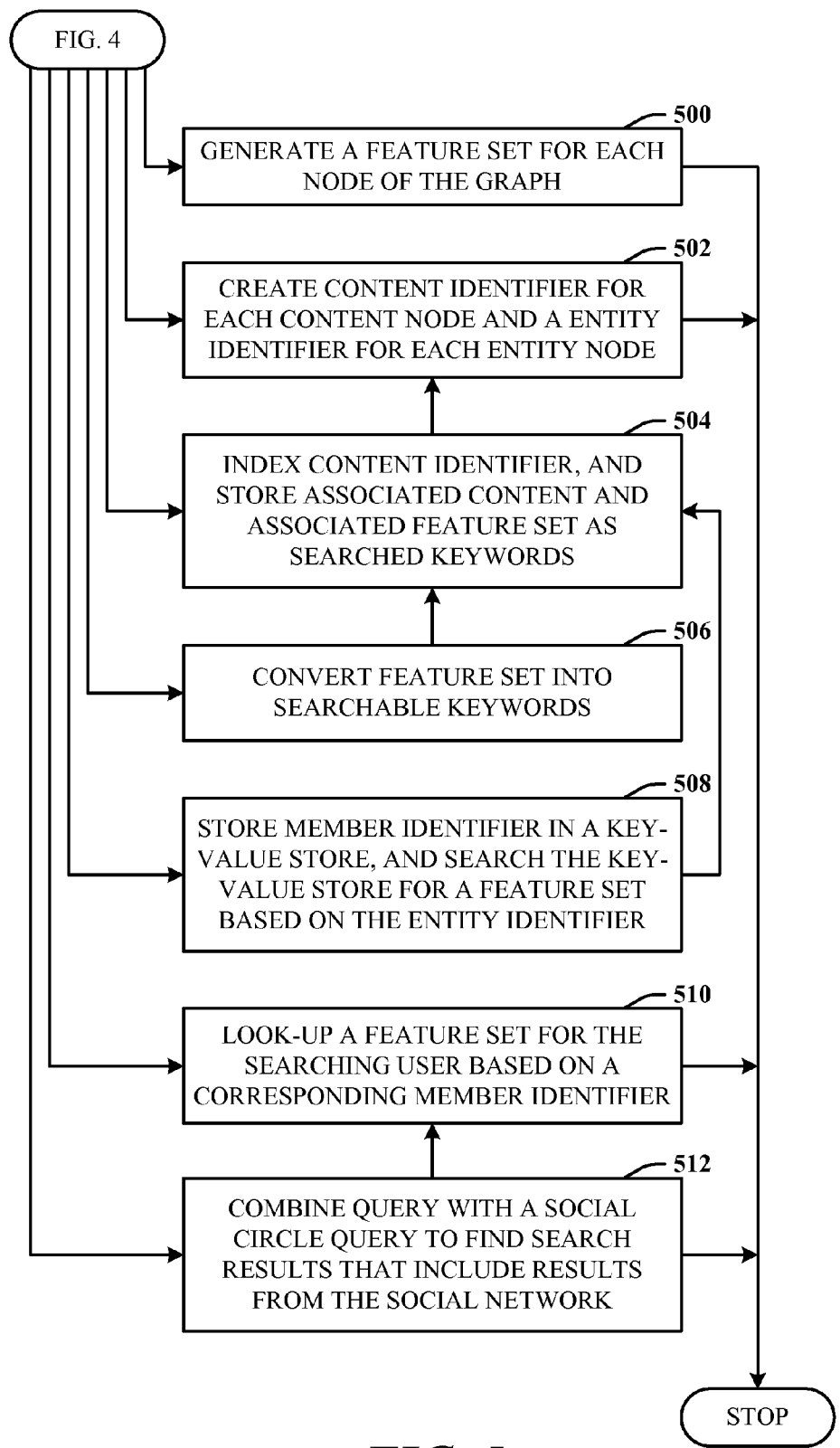
FIG. 5 illustrates further aspects of the method of FIG. 4.

FIG. 5 illustrates further aspects of the method of FIG. 4. Note that the flow indicates that each block can represent a step that can be included, separately or in combination with other blocks, as additional aspects of the method represented by the flow chart of FIG. 4. At 500, a feature set is generated for each node of the graph. At 502, a content identifier is created for each content node and an entity identifier is created for each member node. At 504, the content identifier is indexed, and the associated content and associated feature set are stored as searched keywords. At 506, the feature set is converted into searchable keywords. At 508, the entity identifier is stored in a key-value store, and the key-value store is searched for a feature set based on the entity identifier. At 510, a feature set for the searching user is looked-up based on a corresponding entity identifier. At 512, the query is combined with a social circle query to find search results that include results from the social network.

Figure 6:
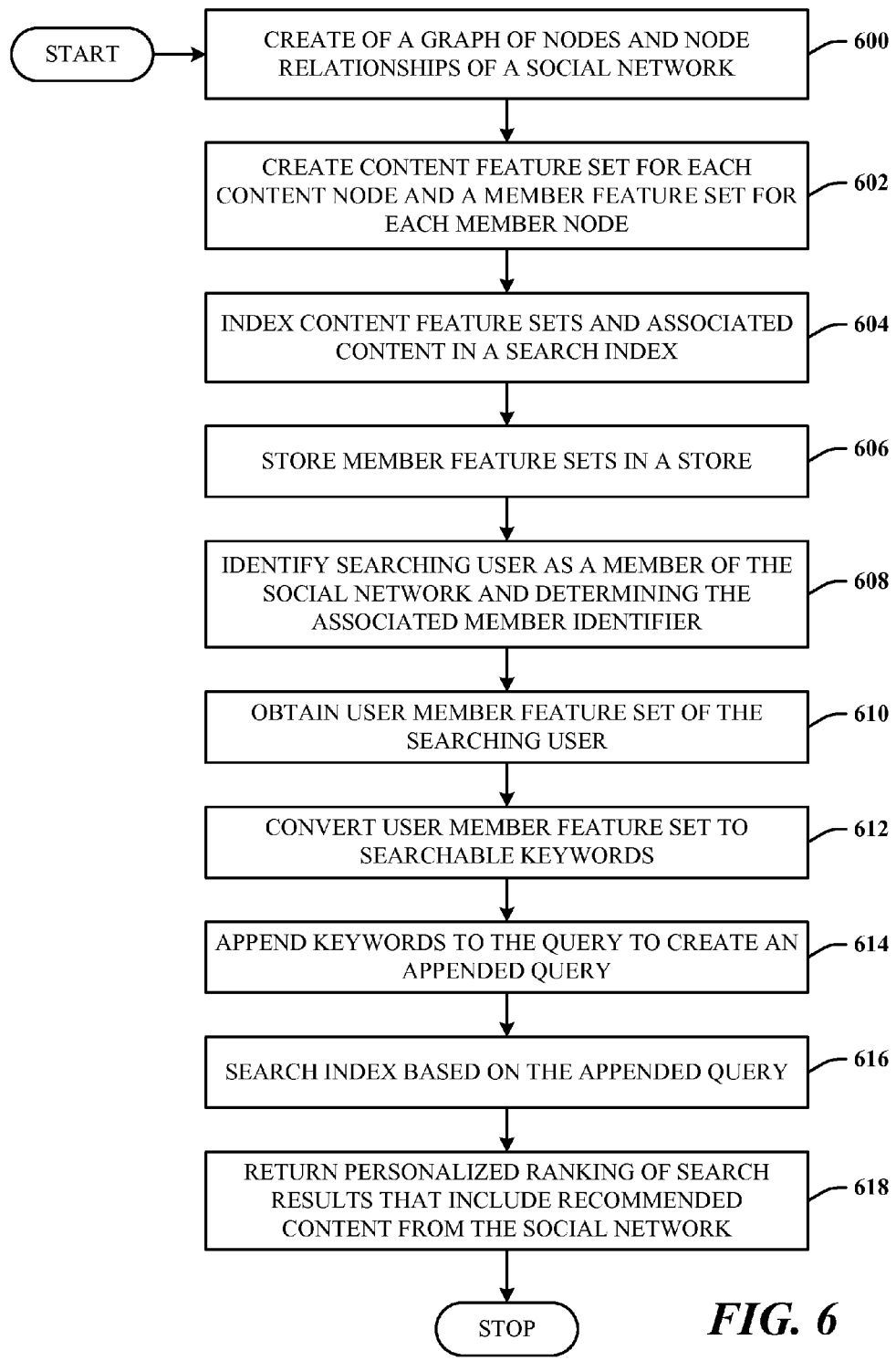
FIG. 6 illustrates an alternative method in accordance with the disclosed architecture.

FIG. 6 illustrates an alternative method in accordance with the disclosed architecture. At 600, of a graph of nodes and node relationships of a social network is created. The graph includes content nodes of content recommended by members of the social network, member nodes of the recommending members, and links between the nodes. At 602, a content feature set is created for each content node and a member feature set for each member node. At 604, the content feature sets and associated content are indexed in a search index. At 606, member feature sets are stored in a store. At 608, a searching user is identified as a member of the social network and determining the associated member identifier. At 610, a user member feature set of the searching user is obtained. At 612, the user member feature set is converted to searchable keywords. At 614, the keywords are appended to the query to create an appended query. At 616, the index is searched based on the appended query. At 618, a personalized ranking of search results is returned that includes recommended content from the social network.

Figure 7:
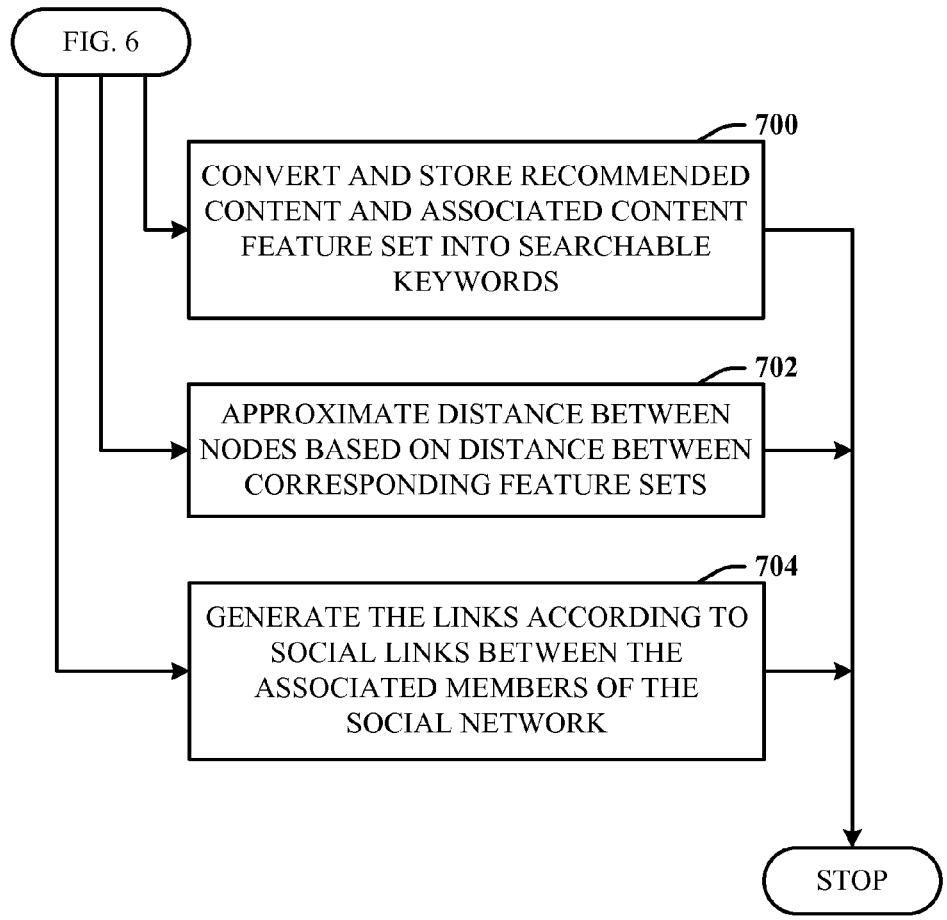
FIG. 7 illustrates further aspects of the method of FIG. 6.

FIG. 7 illustrates further aspects of the method of FIG. 6. Note that the flow indicates that each block can represent a step that can be included, separately or in combination with other blocks, as additional aspects of the method represented by the flow chart of FIG. 6. At 700, the recommended content and associated content feature set are converted and stored into searchable keywords. At 702, the distance between nodes is approximated based on distance between corresponding feature sets. At 704, the links are generated according to social links between the associated members of the social network.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
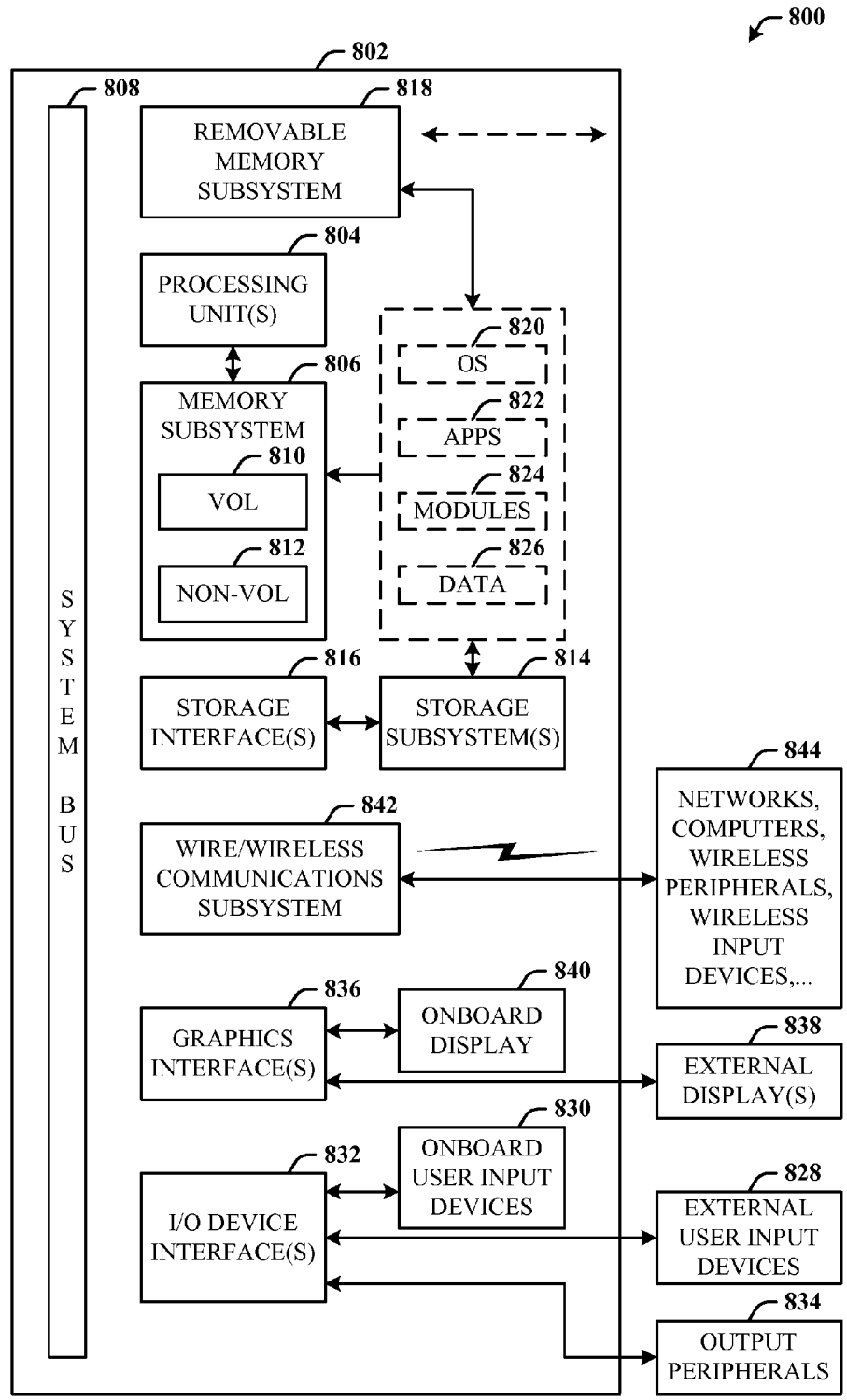
FIG. 8 illustrates a block diagram of a computing system that executes social network searching in accordance with the disclosed architecture.

Referring now to FIG. 8, there is illustrated a block diagram of a computing system 800 that executes social network searching in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The operating system 820, one or more application programs 822, other program modules 824, and/or program data 826 can include entities and components of the system 100 of FIG. 1, entities and components of the system 200 of FIG. 2, entities and flow of the diagram 300 of FIG. 3, and the methods represented by the flowcharts of FIGS. 4-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   creating a graph of nodes and node relationships, the graph comprising content nodes of content recommended by members of a social network, entity nodes of the recommending members, and links between the entity nodes according to social links between associated members in the social network, each content node being configured so that the content node (i) does not link to another content node and (ii) links to only a single entity node, the single entity node being the entity node of the recommending member who has recommended the content of the content node;
   converting each node to a feature set of auxiliary information;
   sampling some sets of the nodes, the nodes of the sampled sets being seed nodes, each feature set including (i) information about seed nodes closest to the node from which the feature set was converted and (ii) distances to those seed nodes, a distance between a pair of feature sets approximating a social distance between the nodes from which the feature sets were converted;
   indexing the node relationships for keyword searches that return recommended content of the content nodes;
   identifying a searching user as associated with the social network; and
   processing a query against the index using keywords.

2. The method of claim 1, further comprising creating a content identifier for each content node and an entity identifier for each entity node.

3. The method of claim 2, further comprising indexing the content identifier, and storing associated content and associated feature set as searched keywords.

4. The method of claim 3, further comprising converting the feature set into searchable keywords.

5. The method of claim 2, further comprising storing the entity identifier in a key-value store, and searching the key-value store for a feature set based on the entity identifier.

6. The method of claim 1, further comprising looking-up a feature set for the searching user based on a corresponding entity identifier.

7. The method of claim 1, further comprising combining the query with a social circle query to find search results that include results from the social network.

8. The method of claim 1, further comprising approximating social distance between the entities associated with the searching user and the recommended content.

9. The method of claim 8, wherein the social distance is based on attributes of the user.

10. The method of claim 9, wherein content recommended by another user is ranked higher when the another user is at the same location as the user.

11. The method of claim 1, wherein each feature set is a vector of the auxiliary information.

12. A method, comprising:
creating a graph of content nodes, entity nodes, and relationships between the nodes, (i) the content nodes being nodes of content recommended by members of a social network, each content node being linkable to only a single entity node, which is the entity node of a member who recommends the content of that content node, and (ii) the entity nodes being of the recommending members, each entity node being linkable to both content nodes and other entity nodes, links between the entity nodes being based on social links between associated members in the social network, converting each node to a feature set of auxiliary information;
sampling some sets of the nodes, the nodes of the sampled sets being seed nodes, each feature set including (i) information about seed nodes closest to the node from which the feature set was converted and (ii) distances to those seed nodes, a distance between a pair of feature sets approximating a social distance between the nodes from which the feature sets were converted;
indexing the node relationships of the created graph for keyword searches that return recommended content of the content nodes;
identifying a searching user as associated with the social network; and
processing a query against the index using keywords.

13. A method, comprising:
creating a graph of nodes and node relationships, the graph consisting of content nodes of content recommended by members of a social network, entity nodes of the recommending members, and links between the entity nodes according to social links between associated members in the social network, each content node being configured so that the content node is linkable only to a single entity node, the single entity node being the entity node of the recommending member who has recommended the content of the content node;
converting each node to a feature set of auxiliary information;
sampling some sets of the nodes, the nodes of the sampled sets being seed nodes, each feature set including (i) information about seed nodes closest to the node from which the feature set was converted and (ii) distances to those seed nodes, a distance between a pair of feature sets approximating a social distance between the nodes from which the feature sets were converted;
indexing the node relationships of the graph for keyword searches that return recommended content of the content nodes to yield an index; and processing a query submitted by a user who is associated with the social network against the index using keywords.

* * * * *